(12) United States Patent
Lau

(10) Patent No.: US 8,240,592 B2
(45) Date of Patent: Aug. 14, 2012

(54) ELECTRONIC DEVICE WITH EARPHONE CONTAINER

(75) Inventor: Choon-Tyng Lau, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 288 days.

(21) Appl. No.: 12/629,621

(22) Filed: Dec. 2, 2009

(65) Prior Publication Data

US 2011/0089283 A1 Apr. 21, 2011

(30) Foreign Application Priority Data

Oct. 20, 2009 (CN) .......................... 2009 1 0308515

(51) Int. Cl.
*B65H 75/38* (2006.01)
(52) U.S. Cl. ...................... 242/388.4; 242/388; 242/398
(58) Field of Classification Search .................. 242/395, 242/388, 388.1, 388.4, 398, 588, 400.1, 405, 242/405.1, 405.2, 405.3; 191/12.2 R, 12.4
See application file for complete search history.

(56) References Cited

U.S. PATENT DOCUMENTS

| | | | | |
|---|---|---|---|---|
| 6,079,657 A * | 6/2000 | Hwang | ........................ | 242/388.1 |
| 6,179,238 B1 * | 1/2001 | Phillipps | ........................ | 191/12.4 |
| 6,682,008 B2 * | 1/2004 | Yeh | ........................ | 191/12.4 |
| 6,698,560 B2 * | 3/2004 | Reardon et al. | ........................ | 191/12.4 |
| 7,032,728 B2 * | 4/2006 | Harcourt | ........................ | 191/12.2 R |
| 7,308,109 B2 * | 12/2007 | Jeong et al. | ........................ | 242/385.3 |

\* cited by examiner

*Primary Examiner* — William A Rivera
(74) *Attorney, Agent, or Firm* — Altis Law Group, Inc.

(57) ABSTRACT

An electronic device includes a base, a restricting piece, a coiling piece, and a cable. The base defines a containing space. The restricting piece is secured in the containing space. The restricting piece includes a pivot and a cable outlet. The coiling piece includes a coiling post. A side of the coiling post defines a pivot hole which receives the pivot of the restricting piece inserted therein to pivotally mount the coiling piece in the containing space. The cable is wrapped on the coiling post, and a part of the cable is inserted through the cable cutout.

13 Claims, 4 Drawing Sheets

ELECTRONIC DEVICE WITH EARPHONE CONTAINER

BACKGROUND

1. Technical Field

The present disclosure relates to electronic devices, and particularly to an electronic device having an earphone container for containing an earphone therein.

2. Description of Related Art

Recently, a plurality of electronic devices, such as smart phones, notebook computers, and so on, having a function for playing music have become known. Usually, an earphone is used to connect with an electronic device. The electronic device plays music and transmits sounds of the music to a user via the earphone. However, it is often inconvenient to bring the earphone together with the electronic device. In addition, the earphone often includes a long cable, which can become tangled.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
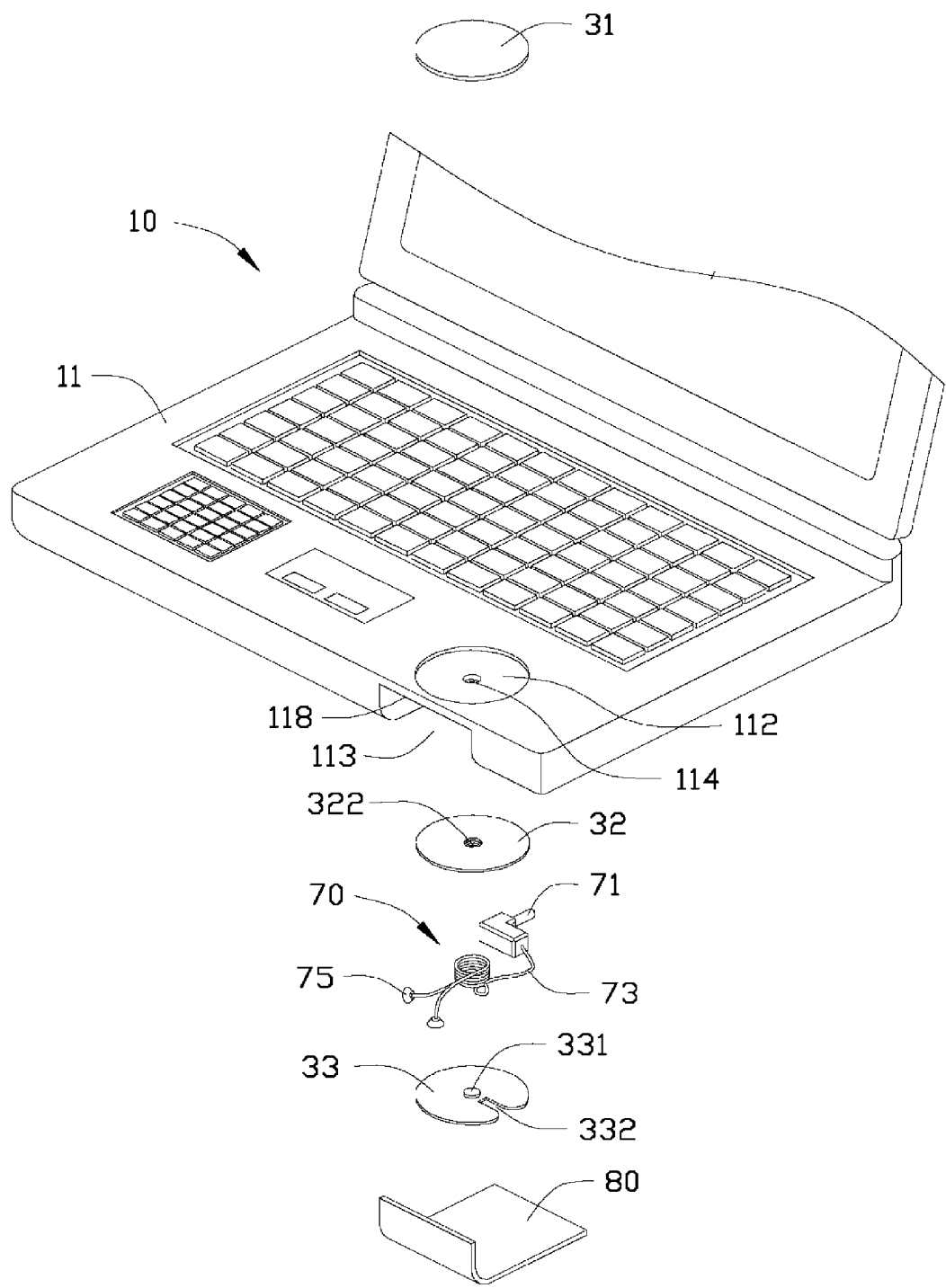
FIG. 1 is an exploded and isometric view of an electronic device and an earphone.
Figure 2:
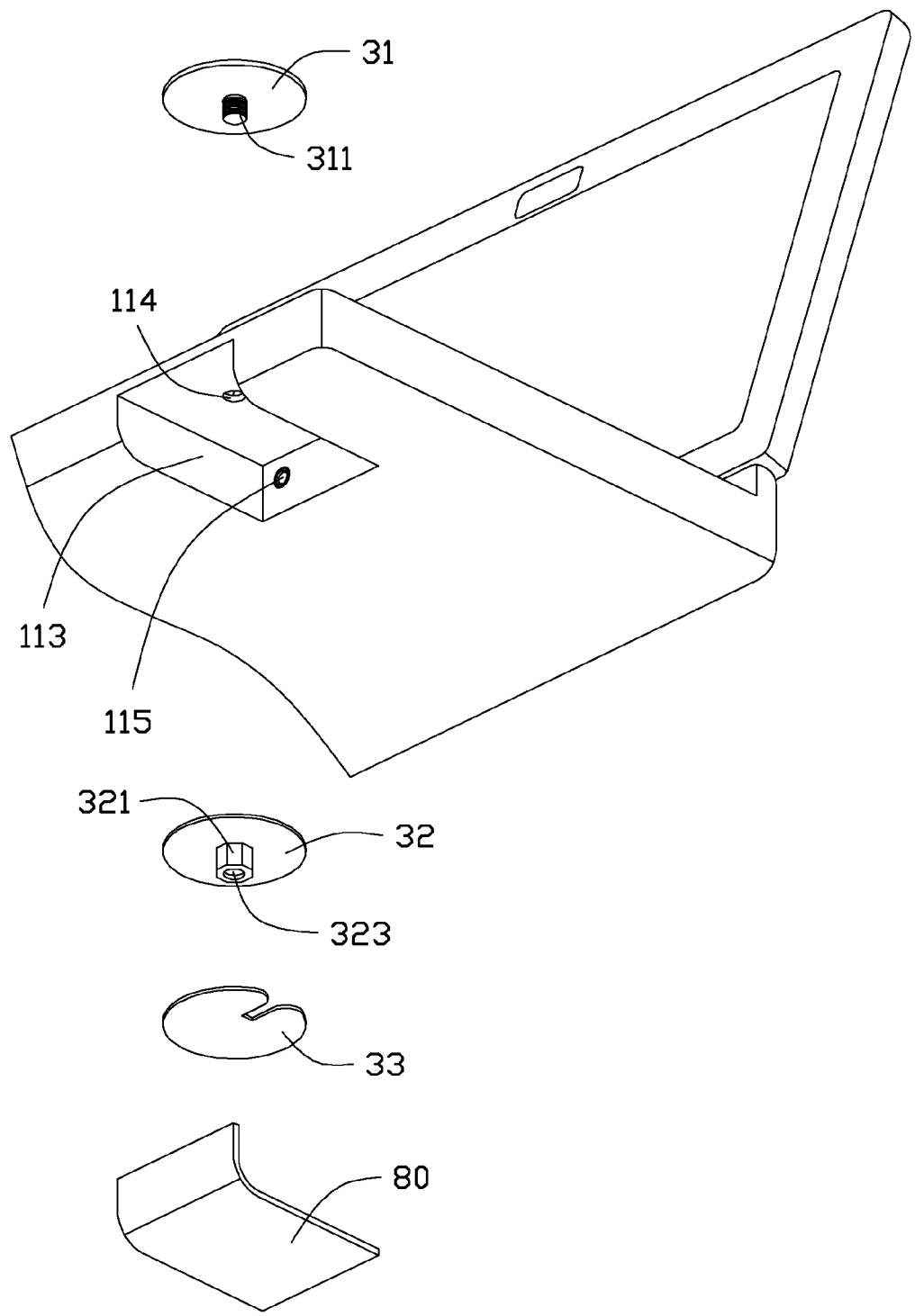
FIG. 2 is similar to FIG. 1, but viewed from another aspect.
Figure 3:
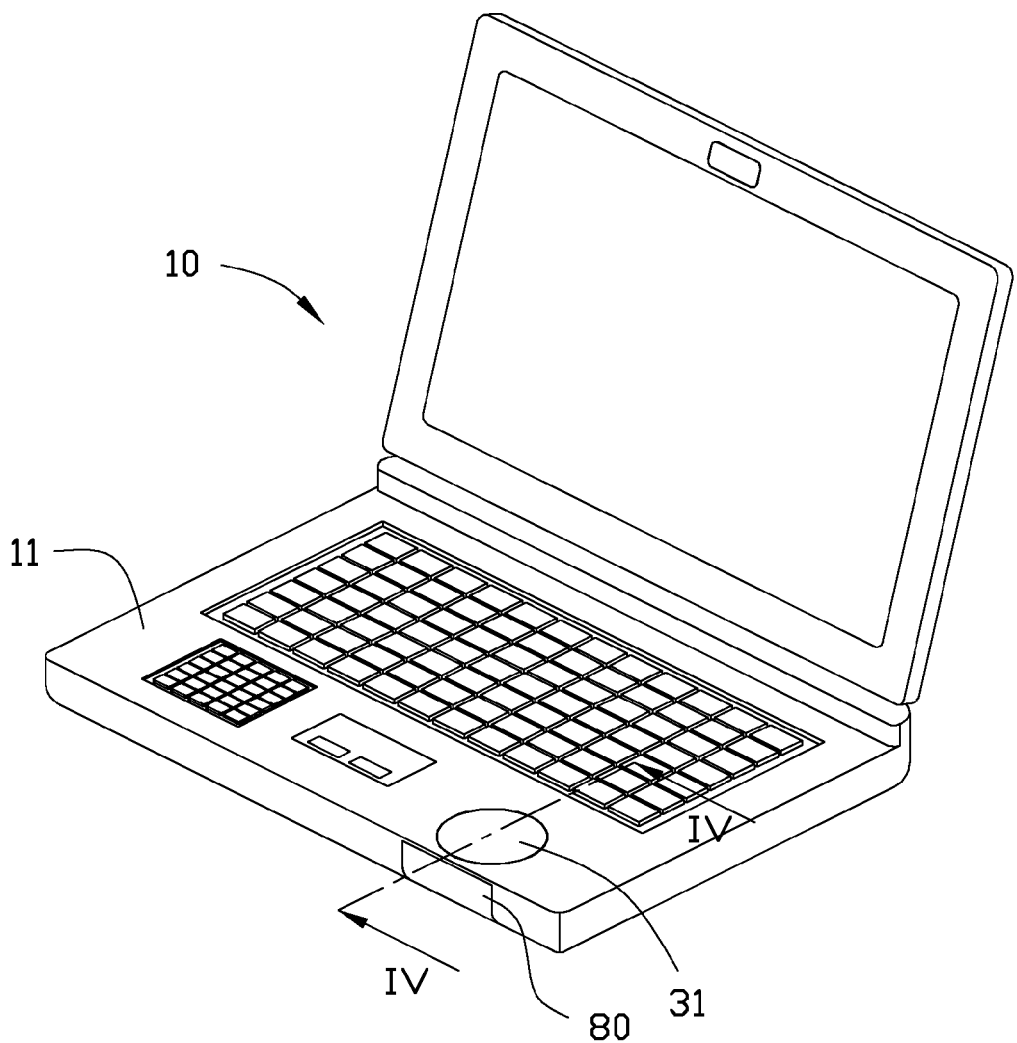
FIG. 3 is assembly view of the electronic device and the earphone of FIG. 1.
Figure 4:
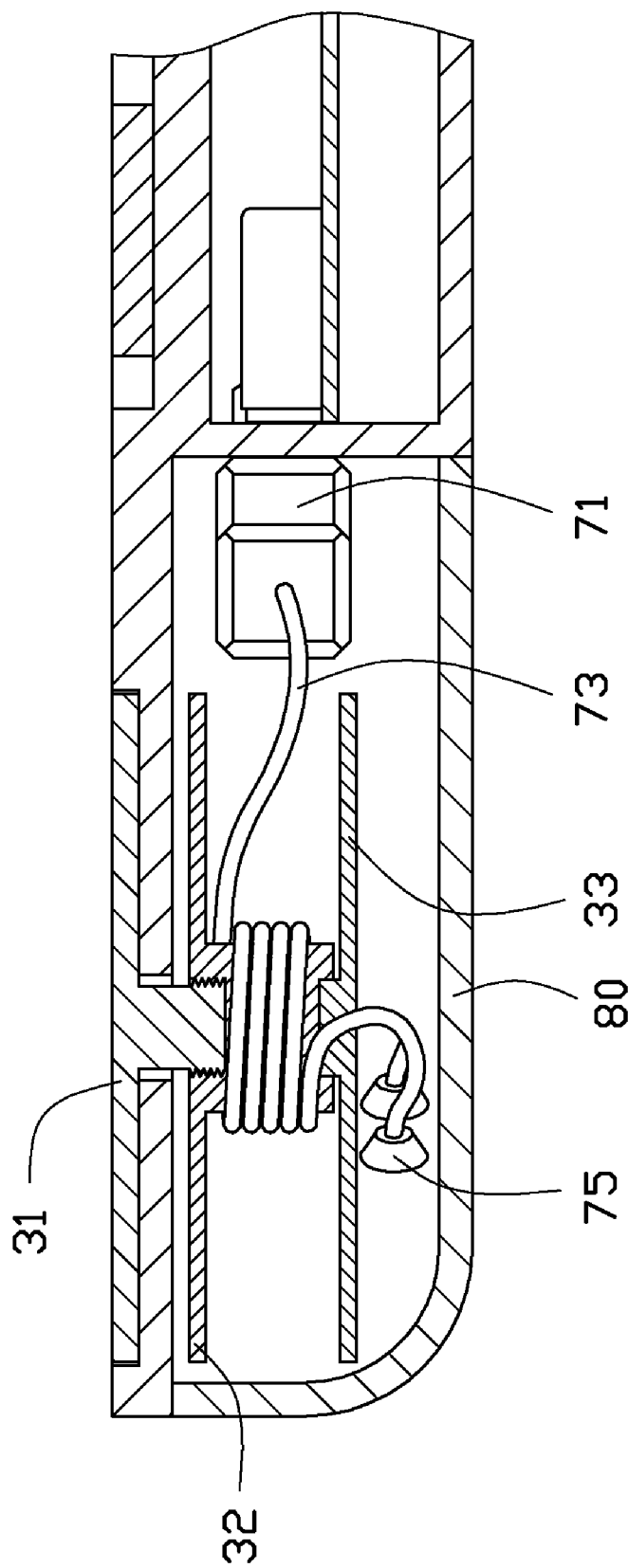
FIG. 4 is a sectional view in an enlarged scale taken along line IV-IV of FIG. 3.

Referring to FIGS. 1 and 2, an electronic device 10 includes a base 11. The electronic device 10 is capable of storing an earphone 70 within. The earphone 70 includes a cable plug 71, a pair of earplugs 75, and an earphones cable 73 connecting the cable plug 71 with the earplugs 75.

The base 11 defines a circular recess 112. A containing space 113 is defined below the recess 112. A sheet 118 separates the recess 112 and the containing space 113. A first pivot hole 114 is defined in the sheet 118 and communicates with the recess 112 and the containing space 113. An earphone socket 115 is mounted in the containing space 113. The cable plug 71 is capable of matching the earphone socket 115.

An earphone mounting apparatus is fixed on the base 11. The earphone mounting apparatus includes a rotatable piece 31, a coiling piece 32, and a restricting piece 33. The rotatable piece 31 is a circular piece, and can be rotatably received in the recess 112 of the base 11. A bottom of the rotatable piece 31 forms a rotatable shaft 311 corresponding to the first pivot hole 114 of the base 11. An outer surface of the rotatable shaft 311 is threaded.

The coiling piece 32 is mountable in the containing space 113 of the base 11. The coiling piece 32 defines a screw hole 322 corresponding to the rotatable shaft 311. A bottom of the coiling piece 32 forms a coiling post 321. A second pivot hole 323 is defined in a bottom side of the coiling post 321.

The restricting piece 33 includes a pivot 331 formed on a top side of the restricting piece 33. A cable outlet 332 is defined in the restricting piece 33.

A cover 80 is fixable on the base 11 to seal the containing space 113.

Referring to FIGS. 1 to 4, to contain the earphone 70 in the electronic device 10, the rotatable piece 31 is placed in the recess 112. The rotatable shaft 311 is inserted through the first pivot hole 114. A bottom end of the rotatable shaft 311 is located in the containing space 113. The coiling piece 32 is placed in the containing space 113 with the screw hole 322 aligned with the rotatable shaft 311. The rotatable shaft 311 is fixed in the screw hole 322 to secure the rotatable piece 31 and the coiling piece 32 together.

The cable plug 71 of the earphone 70 is coupled with the earphone socket 115 to connect the earphone 70 to the electronic device 10. The cable 73 of the earphone 70 is coiled on the coiling post 321 of the coiling piece 32. The pivot 331 of the restricting piece 33 is inserted in the second pivot hole 323 to restrict the cable 73 on the coiling post 321. One end of the cable 73, which is connected to the earplugs 75, is located in the cable outlet 332. Therefore, the earplugs 75 are located below the restricting piece 33. The coiling piece 32 is then stationary and firmly secured in the base 11 by convention means, such as rivet connection, welding connection, and so on. The cover 80 is mounted on the base 11 to seal the containing space 113. Thus, the earphone 70 is contained in the containing space 113 of the electronic device 10.

To retrieve the earphone 70, the cover 80 is detached from the base 11. The earplugs 75 of the earphone 70 are pulled outwards, thereby, driving the coiling piece 32 to rotate. The cable 73 of the earphone 70 gradually unwinds and extends out of the coiling post 321.

To return the earphone 70 in the containing space 113, the rotatable piece 31 is rotated, thus driving the coiling piece 32 to rotate also. As a result, the coiling piece 32 winds the cable 73 of the earphone 70 around the coiling post 321 until the earphone 70 is completely contained in the containing space 113. The cover 80 seals the containing space 113 to fix the earphone 70 in the electronic device 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device, comprising:
   a base defining a containing space;
   a restricting piece secured in the containing space, the restricting piece comprising a pivot and a cable outlet;
   a coiling piece comprising a coiling post, a side of the coiling post defining a pivot hole which receives the pivot of the restricting piece inserted therein to pivotally mount the coiling piece in the containing space; and
   a cable wrapped on the coiling post, and a part of the cable is inserted through the cable outlet;
   wherein a rotatable piece is secured to and capable of driving the coiling piece, the base defines a recess thereon; a sheet separates the recess and the containing space, a first pivot hole is defined in the sheet so that the recess is in communication with the containing space, the rotatable piece comprises a rotatable shaft rotatably located in the first pivot hole and attached to the coiling piece.

2. The electronic device of claim 1, wherein the recess is circular, and the rotatable piece is circular and capable of rotating in the recess.

3. The electronic device of claim 1, wherein the coiling piece defines a screw hole, an outer surface of the rotatable shaft forms a screw thread thereon, and the rotatable shaft is secured in the screw hole.

4. The electronic device of claim 1, further comprising a detachable cover.

5. The electronic device of claim 1, further comprising an earphone socket in the containing space.

6. An electronic device, comprising:
a base which defines a containing space;
a coiling piece pivotally mounted in the containing space, the coiling piece comprising a coiling post; and
a rotatable piece located on the base, the rotatable piece secured to the coiling piece and capable of driving the coiling piece;
wherein the base defines a recess thereon; a sheet separates the recess and the containing space, a first pivot hole is defined in the sheet so that the recess is in communication with the containing space, and the rotatable piece comprises a rotatable shaft rotatably located in the first pivot hole and secured to the coiling piece.

7. The electronic device of claim 6, wherein the recess is circular, and the rotatable piece is circular and capable of rotating in the recess.

8. The electronic device of claim 6, wherein the coiling piece defines a screw hole, an outer surface of the rotatable shaft forms a plurality of screw thread thereon, and the rotatable shaft is secured in the screw hole.

9. The electronic device of claim 6, wherein a restricting piece is secured in the containing space, the restricting piece is located below the coiling post to restrict a cable on the coiling post.

10. The electronic device of claim 9, wherein the restricting piece defines a cable outlet.

11. The electronic device of claim 9, wherein a second pivot hole is defined in a bottom side of the coiling post; the restricting piece comprises a pivot that is inserted in the second pivot hole.

12. The electronic device of claim 6, further comprising a detachable cover.

13. The electronic device of claim 6, further comprising an earphone socket in the containing space.

* * * * *